United States Patent [19]

Chopin et al.

[11] Patent Number: 5,210,063
[45] Date of Patent: May 11, 1993

[54] CRUSH-RESISTANT/ADSORPTIVE AGGLOMERATES OF ACTIVATED ALUMINA

[75] Inventors: Thierry Chopin, Saint Denis; Patrick Fourre, Paris; Philippe Jaeger, Salindres; Bernard Taxil, Ales, all of France

[73] Assignee: Rhone-Poulenc Chimie, Courbevoie, France

[21] Appl. No.: 818,904

[22] Filed: Jan. 10, 1992

Related U.S. Application Data

[63] Continuation of Ser. No. 659,881, Feb. 25, 1991, abandoned.

[30] Foreign Application Priority Data

Feb. 23, 1990 [FR] France ............................ 90 02273

[51] Int. Cl.$^5$ ............................................. B01J 20/08
[52] U.S. Cl. ................................... 502/415; 502/506
[58] Field of Search ..................... 502/415, 506, 510

[56] References Cited

U.S. PATENT DOCUMENTS

| 3,226,191 | 12/1985 | Osment et al. | 502/415 |
| 3,701,718 | 10/1972 | Papee et al. | 502/415 |
| 4,766,101 | 8/1988 | Nortier et al. | 502/164 |
| 4,902,666 | 2/1990 | Rainie | 502/439 |

FOREIGN PATENT DOCUMENTS 56-102939  8/1981  Japan .

*Primary Examiner*—Asok Pal
*Assistant Examiner*—P. Achutamurthy
*Attorney, Agent, or Firm*—Burns, Doane, Swecker & Mathis

[57] ABSTRACT

Activated alumina agglomerates having a crush resistance of at least 12 daN, measured on that fraction thereof having a mean diameter ranging from 3 to 4 mm, and an adsorptive capacity greater than 18% by weight, well adopted as adsorbents in a wide variety of purification processes, are prepared by agglomerating activated alumina particulates, maturing the resulting agglomerates in the presence of a complexing agent for the cation $Al^{3+}$, and then thermally treating the matured agglomerates at a temperature ranging from about 100° to 500° C.

12 Claims, 2 Drawing Sheets

CRUSH-RESISTANT/ADSORPTIVE AGGLOMERATES OF ACTIVATED ALUMINA

This application is a continuation of application Ser. No. 07/659,881, filed Feb. 25, 1991, now abandoned.

BACKGROUND OF THE INVENTION

1. Field of the Invention

The present invention relates to novel activated alumina agglomerates having good properties of adsorption and improved mechanical properties and to a process for the production thereof.

This invention especially relates to small spheres of such activated alumina.

2. Description of the Prior Art

The use of alumina as an adsorbent for eliminating impurities present in a fluid, which can be liquid or gaseous, is known to this art. The alumina is used particularly to remove water contained in a current of gas.

Generally, the above purification is carried out by passing the fluid through a bed of alumina agglomerates, preferably in the form of small spheres stacked inside a purification column.

Consequently, alumina agglomerates destined for use as adsorbents must not only have a good adsorptive capacity, but also excellent mechanical properties, in particular a good resistance of crushing (crush strength).

Heretofore, however, it has been found that, as the mechanical properties of alumina agglomerates are increased, their adsorption properties decrease.

SUMMARY OF THE INVENTION

Accordingly, a major object of the present invention is the provision of novel alumina agglomerates having both good adsorption capacity and improved mechanical properties.

Another object of the present invention is the provision of such novel alumina agglomerates in the form of small spheres that can be easily transported for charging into and discharging from purification columns, for example by pneumatic systems.

Still another object of this invention is the provision of particular process for the production of such novel alumina agglomerates and small spheres comprised thereof.

Briefly, the present invention features agglomerates of activated alumina having a crush resistance greater than 12 daN, measured on agglomerates of activated alumina having a mean diameter ranging from 3 to 4 mm, and an adsorption capacity greater than 18%, expressed as percentage by weight of water adsorbed.

DETAILED DESCRIPTION OF THE PREFERRED EMBODIMENTS OF THE INVENTION

Figure 1:
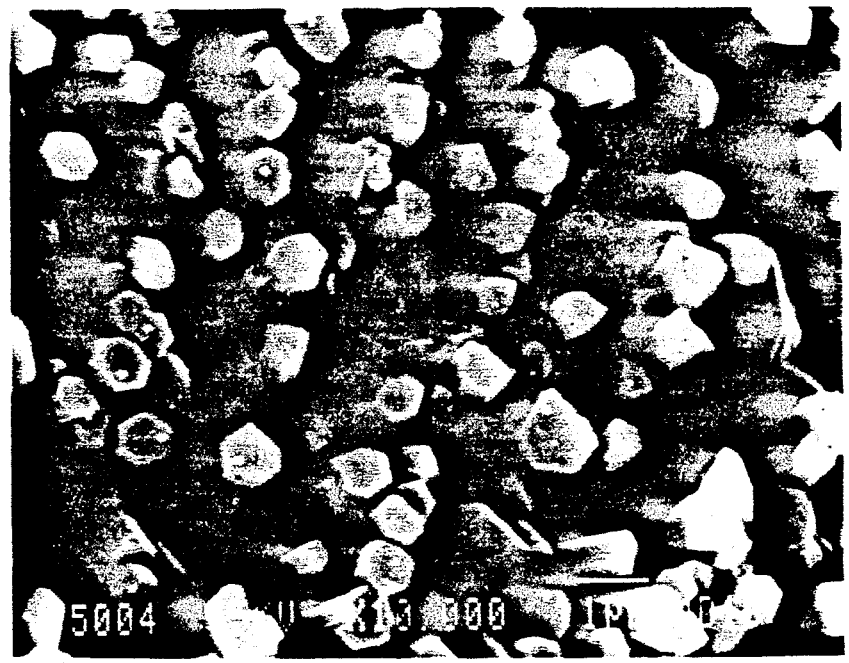
FIG. 1 is an electron photomicrograph showing the surface morphology of alumina agglomerates prepared using a complexing agent according to the present invention.

More particularly according to the present invention, by "mean diameter" is intended a diameter such that 50% by weight of the agglomerates have a diameter greater or less than the mean diameter.

The agglomerates of activated alumina of the invention are preferably in the form of small spheres having a mean diameter ranging from about 1 to 10 mm. They have a resistance to crushing greater than 12 daN, preferably ranging from 12 to 25 daN. In a preferred embodiment of the invention such resistance is greater than 15 daN, and most preferably ranges from 15 to 20 daN.

It will be appreciated that the values of crush resistance given above are with respect to alumina agglomerates having a mean diameter ranging from 3 to 4 mm. Such values are thus defined with reference to the mean diameter of the agglomerates.

Therefore, activated alumina agglomerates according to the invention have a mean diameter ranging from 6 to 7 mm and display a crush resistance greater than 22 daN, preferably greater than 25 daN and more preferably ranging from 30 to 50 daN.

The other characterizing property of the activated alumina agglomerates of the invention is a good capacity for adsorption of water, greater than 18% and preferably ranging from 20% to 24%.

In comparison with the small spheres of alumina conventionally used as adsorbents, the alumina agglomerates of the invention have the characteristic of possessing a greater crush resistance for equivalent adsorptive properties.

By way of comparison with small spheres of alumina commercially available form Rhone-Poulenc under the Trademark SPHERALITE 501.4, these have a good capacity of adsorption of 18% to 24%, but a resistance to crushing of only 10 daN, which would be desirable to increase.

In a preferred embodiment of the invention, the activated alumina agglomerates are also distinguished by a surface morphology including small rods, i.e., in the form of small cylindrical rods. This morphology can be correlated with that of agglomerates obtained before calcination and, more precisely, following the rehydration of the activated alumina. As utilized hereinafter, the morphology of said agglomerates will be designated as that of "intermediate alumina agglomerates". It is possible to delineate other structural, textural and mechanical characteristics of the agglomerates of the invention.

The process for preparing the activated alumina agglomerates of the invention comprises maturing (aging) activated alumina agglomerates under atmospheric pressure in the presence of a complexing agent for the $Al^{3+}$ cation, and then thermally treating said agglomerates at a temperature ranging from 100° to about 500° C.

It has now been determined that the solidity of the activated alumina agglomerates can be increased by influencing the rehydration of activated alumina towards the formation of boehmite, by adding an effective amount of a complexing agent prior to the maturing operation.

In a conventional procedure for making small spheres of activated alumina, activated alumina powder is ground and granulated, then matured. During these two steps, the activated alumina powder is rehydrated to boehmite ($Al_2O_3 \cdot H_2O$) and bayerite ($Al_2O_3 \cdot 3H_2O$). Upon completion of the maturing, the rehydration rate of the alumina is at least equal to 30% and generally favors the formation of up to 20% to 25% of bayerite and less than 5% of boehmite.

In accordance with the process of the invention, the alumina is rehydrated into an amount of boehmite of at least 5%, preferably 8% to 20%; thus, bayerite constitutes the complement at least equal to 30%. Accordingly, it has now also unexpectedly been found that the increase in the amount of boehmite enables the mechanical properties of the final agglomerates to be improved without very much affecting their adsorption.

A first embodiment of the process of the invention entails introducing the complexing agent during the operation of grinding the activated alumina powder.

A second embodiment of the process of the invention entails introducing the complexing agent during the operation of agglomerating the activated alumina powder.

A third embodiment of carrying out the invention entails optionally grinding the activated alumina powder, then agglomerating it and treating the resulting agglomerates with the complexing agent, before effecting the maturing thereof.

The activated alumina agglomerates employed according to the present invention are prepared starting from an activated alumina powder having a poorly crystallized and/or amorphous structure.

In such process by "alumina of poorly crystalline structure" is intended an alumina such that X-ray analysis gives a diagram that presents only one or a few diffuse lines corresponding to crystalline phases of low-temperature transition aluminas and essentially containing the phases chi, rho, eta, gamma and pseudo-gamma, and mixtures thereof.

By "alumina of amorphous structure" is intended an alumina such that X-ray analysis thereof indicates no line whatsoever characteristic of a crystalline phase.

The activated alumina used in the invention is generally provided by rapid dehydration of aluminum hydroxides such as bayerite, hydrargillite or gibbsite, norstrandite or aluminum oxyhydroxides such as boehmite and diaspore.

This dehydration is effected by using a current of hot gases which permits elimination and very rapid entrainment of the water evaporated. The temperature of the gases in the apparatus generally ranges from about 400 to 1200 C with a contact time of the hydroxide with the hot gases on the order of a fraction of a second to four or five seconds.

The alumina thus prepared can be used as such, or, depending on the application envisaged, can be treated to eliminate, in particular, the alkalis present: a content of $Na_2O$ less than 0.5% will be preferred.

The specific surface, measured by the BET method of the activated alumina prepared by rapid dehydration of hydroxides or oxyhydroxides of aluminum, generally ranges from about 50 to 400 $m^2/g$; the diameter of the particles generally ranges from 0.1 to 300 microns, preferably from 1 to 120 microns.

This alumina provides a pore volume on the order of 0.10 to 0.50 $cm^3/g$, the pores having dimensions less than 50 nm.

In another preferred embodiment of the invention, the activated alumina obtained by the rapid dehydration of Bayer hydrate (hydrargillite), which is an industrially readily available aluminum hydroxide that is relatively inexpensive. Such an activated alumina is well known to this art, and is described, in particular, in FR-A 1,108,011.

According to the process of this invention, activated alumina is contacted with a complexing agent for the $Al^{3+}$ cation prior to the maturing or aging operation, either in the state of a powder or in the form of agglomerates.

Exemplary complexing agents for the cation $Al^{3+}$ include at least one compound selected from among the acids comprising at least one carboxylate group and at least two hydroxy and/or amine groups, or comprising at least two carboxy groups and at least one hydroxy and/or amine group, and the salts thereof.

Representative such organic phosphoric acids have the following formulae (I) to (III):

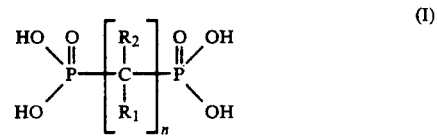

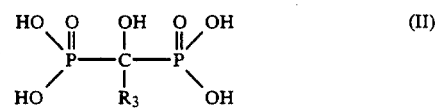

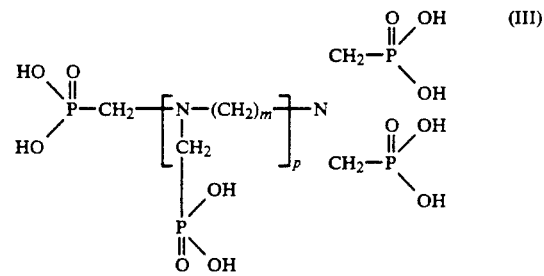

in which formulae (I) to (III), n and m are integers ranging from 1 to 6; p is an integer ranging from 0 to 5; $R_1$, $R_2$ and $R_3$, which may be identical or different, each represents a hydrogen atom or an alkyl, aryl, aralkyl, hydroxy or amino radical, or a hydroxyquinoline or derivative thereof corresponding to the following (IV):

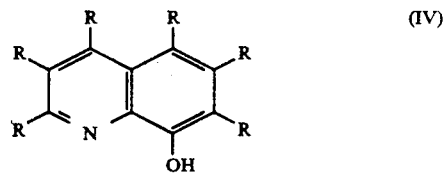

in which formula (IV), R is a hydrogen atom, a $C_{1-20}$ hydrocarbon radical or a halogen atom.

Among the carboxylic acids useful as complexing agents for the $Al^{3+}$ cation, more particularly preferred are the $C_{2-15}$ and preferably $C_{2-10}$ carboxylic acids.

Exemplary such acids include the following:

(i) oxalic acid;

(ii) hydroxypolycarboxylic acids, more particularly hydroxydi- or hydroxytricarboxylic acids, such as, for example, maleic acid, citric acid or tartronic acid;

(iii) (polyhydroxy)monocarboxylic acids, such as, for example, glucoheptonic and gluconic acids; and (iv) poly(hydroxycarboxylic)acids, such as, for example, tartaric acid.

A mixture of these acids can be used equally as well. Preferably, citric or oxalic acid is used.

The salts of these acids are equally suitable according to this invention. The preferred salts are the salts of alkali metals such as sodium salts, or ammonium salts.

Further as regards the complexing agents of formulae (I) to (III), an organic, particularly aliphatic, substituted or unsubstituted organic phosphoric acid is preferably used. This may contain 1 to 15 and preferably 1 to 10 carbon atoms.

Exemplary such compounds include methylene aminotriphosphonate, methylene ethylenediaminotetraphosphonate, methyl triethylenetetraaminohexaphosphonate, methylene tetraethylenepentaaminoheptaphosphonate, methylene pentaethylenehexaaminooctaphosphonate the diphosphonates of methylene, 1,1'-ethylene, 1,2-ethylene, 1,1,-propylene, 1,3-propylene, and 1,6-hexamethylene; 2,4 -dihydroxypentamethylene-2,4-diphosphonate; 2,5-dihydroxyhexamethylene-2,5-diphosphonate; 2,3-dihydroxybutylene-2,3-diphosphonate; 1-hydroxybenzyl-1,1'-diphosphonate; 1-aminoethylene-1,1'-diphosphonate; hydroxymethylene diphosphonate; hydroxyethylene-1,1'-diphosphonate; 1-hydroxypropylene-1,1'-diphosphonate; 1-hydroxybutylene-1,1'-diphosphonate; and 1-hydroxyhexamethylene-1,1'-diphosphonate.

For those complexing agents corresponding to formula (IV), preferred are those compounds in which R is a hydrogen atom or straight or branched chain saturated or unsaturated aliphatic radical preferably having from 5 to 20 carbon atoms.

In a preferred embodiment, oxine (8-hydroxy-quinoline) is used, or an 8-hydroxy-quinoline of formula (IV) in which every R is a hydrogen atom, except that at the 7position in the ring R is an alkyl radical of the formula $C_mH_{2m+1}$ with m ranging from 5 to 20.

The complexing agent such as defined above can be used in solid form or, preferably, in the form of an aqueous solution, the concentration of which preferably ranging from 0.01 to 1 mole/liter.

The amount of complexing agent introduced with respect to the amount of alumina is determined by the type of alumina that it represents, preferably ranging from 0.01% to 5% by weight of alumina and more preferably from 0.05% to 0.5%.

Prior to agglomeration of the activated alumina, it can be advantageous to grind the activated alumina powder such that it is reduced to particles having a mean diameter ranging from about 1 to 20 microns.

Crushing, whether in the moist or dry state, is typically carried out.

It is possible to effect such crushing by a jet of air, but most often the crushing is carried out in a conventional manner in a ball grinder, dry or with the addition of water.

A first embodiment of the process of the invention entails introducing the complexing agent over the course of the grinding operation, in particular by spraying an aqueous solution containing the complexing agent onto the activated alumina powder.

This operation of crushing is optional and in its absence it is necessary to add the complexing agent in the following step.

Another embodiment of the invention entails adding the complexing agent over the course of the agglomeration operation.

The agglomeration of activated alumina is carried out according to methods per se known to this art such as, for example, by pelleting, extrusion, shaping into spheres in a rotary pelleting machine, and the like.

This agglomeration can be carried out on activated alumina such as that produced by dehydration and optional subsequent treatments, or on an activated alumina crushed to one or more predetermined granulometries.

This agglomeration can be effected in a manner well known to this art, by adding porogenic agents to the mixture to be agglomerated. Porogenic agents that can be used include, in particular, wood flour, wood carbon, cellulose, starches, naphthalene, and, in general, any compound that will be eliminated by calcination.

A preferred embodiment of the invention entails spraying an aqueous solution containing the complexing agent onto an activated alumina powder in a state of agitation, for example rotating in a pelleting machine.

In another embodiment of the process of the invention, the complexing agent can be added to the activated alumina agglomerates prior to the maturing operation.

The addition of the complexing agent can be carried out, in particular, by spraying an aqueous solution containing the complexing agent onto the said agglomerates.

Whether the complexing agent is added at the time of maturing or in a preceding step, the activated alumina agglomerates are subjected to the maturing operation, over the course of which the alumina is rehydrated and the boehmite crystalline phase is developed.

The operation of maturing, or aging, is carried out at a temperature ranging from 80° to 120° C., preferably at about 100° C.

The duration of the maturing is variable and preferably ranges from 1 to 24 hours, more preferably from 2 to 6 hours.

A preferred embodiment of the maturing step entails quick injection of water vapor onto the alumina agglomerates.

In accordance with the process of the invention, the activated alumina agglomerates obtained after maturing are subjected to a thermal treatment in order to stabilize the specific surface of the alumina and promote the adsorbent properties of the agglomerates.

The thermal treatment is carried out at a temperature ranging from about 100° to 500° C., for a period of time sufficient to remove the free and structural water.

Over the course of this step, the porogenous agent can be decomposed.

It is possible to carry out the thermal treatment in a single operation, for example in a rotating industrial furnace where the temperature is graded in the temperature range illustrated, depending on the position of the agglomerates with respect to the heat source, which is preferably a gas burner.

In this event, the duration of the thermal treatment preferably ranges from 2 to 12 hours.

The thermal treatment can be effected equally well in two conventional steps: drying, then calcination.

The activated alumina agglomerates can then be dried at a temperature generally ranging from about 100° to 250° C., for a period of time most typically ranging from 2 to 24 hours.

They are subsequently subjected to a calcination operation at a temperature ranging from 250° to 500° C. over a period of time ranging from, for example, 1 to 8 hours.

After thermal treatment, the activated alumina agglomerates obtained essentially consist of alumina. Their ignition weight loss is on the order to 2% to 6%.

As indicated above, the subject alumina agglomerates are preferably in the form of small spheres having a mean diameter ranging from 1 to 10 mm.

By "mean diameter" is intended a diameter such that 50% by weight of the spheres have a diameter greater or less than the mean diameter. The mean diameter is determined by sifting using different sieves having openings of defined mesh.

The textural properties of the activated alumina agglomerates of the invention are set forth below.

Their BET specific surface area generally ranges from 250 to 400 m$^2$/g, preferably from 290 to 350 m$^2$/g.

The specific surface area expressed is a BET specific surface, i.e., determined by nitrogen adsorption conforming to ASTM standard D 3663-78, established by the Brunauer-Emmet-Teller method (*Journal of the American Chemical Society*, 60, 309 (1938)).

Their total pore volume TPV most typically ranges from 0.40 cc/g to 0.60 cc/g.

The total pore volume is determined by measuring the specific gravities.

The total pore volume TPV is given by the following formula:

$$TPV = \frac{1}{Dg} - \frac{1}{Da}$$

where Dg=density of the particle and Da=absolute density.

The particle and absolute densities Dg and Da, respectively, are measured by the pycnometric method using mercury and helium; then the TPV is calculated from the above formula.

The activated alumina agglomerates according to the invention have a total packing density TPD ranging from about 500 to 1,00 g/cc.

To determine the TPD, a given weight of agglomerates is introduced into a graduated cylinder to provide a given volume. The cylinder is then vibrated until packing ceases and a constant volume is obtained. The weight of the agglomerates that occupy a unit volume is calculated.

Insofar as the mechanical properties of the agglomerates is concerned, they possess a very good resistance to crushing as defined above.

The measure of crushing resistance particle by particle CR is carried out in a Lhomargy DY.20 B crushing apparatus, the jaws of which are closed at a speed of 0.5 mm/minute.

10 spheres are removed at random from the granulometric fraction 3.15 to 4 mm. They are placed successively between the hammer and the anvil of the apparatus using Brucelles pincers.

The final result (expressed in daN) is given as the mean of the crushing strength of the 10 spheres.

The activated alumina agglomerates of the invention display an equally good resistance to attrition, greater than about 98%.

The attrition resistance is measured as the percentage of product not consumed by friction according to a method described below, which entails subjecting a predeter-mined weight of agglomerates to intense agitation and measuring the amount of agglomerates remaining that have not been reduced to dust.

Before carrying out this test, the agglomerates are conditioned by a thermal treatment for two hours in a furnace, the temperature of which is regulated at 300° C.

After cooling in a desiccator, the product is sieved to its lowest nominal dimension using an Afnor sieve. For example, if the spheres have a diameter of 1.6 to 2.5 mm, the sifting is to 1.6 mm. A precise amount of the sifted product (about 10 g) is weighed out.

This amount is placed in a 65 cc stainless steel grinder vessel in a shaker marketed by Prolabo under the trademark Dangoumau microgrinder. The microgrinder is operated for exactly 5 minutes.

When the agitation is completed, the product recovered is sifted using a sieve corresponding to three quarters of the smallest dimension of the starting material.

The sifted product is placed in a furnace for two hours at 300° C.

After cooling in a desiccator, the agglomerates that do not pass through the sieve are weighed.

The attrition resistance AR is given by the following formula, where $W_1$ is the weight of the sample and $W_2$ is the weight of the agglomerates remaining on the sieve after testing:

$$AR = \frac{W_2}{W_1} \times 100\ (\%)$$

As well as having very good mechanical properties, the activated alumina agglomerates according to the invention have a good adsorption capacity EO.6, as high as 25%.

The test for determining the adsorption capacity entails measuring the amount of water fixed by the activated alumina in an atmosphere when the vapor pressure of water is equal to 60% of saturation.

This pressure is attained above a saturated aqueous solution of sodium bromide maintained at 15° C.

To eliminate the water that the sample has adsorbed during its exposure to the above atmosphere, the sample is regenerated for two hours at 300° C. before analysis. An exact amount, in the vicinity of 2 g, of the alumina agglomerates is weighed in a weighing bottle. The weighing bottle is placed, open, in a vacuum desiccator containing sodium bromide. After the pressure in the desiccator has been reduced to 15 mm of mercury, it is placed for twenty-four hours in a thermostatted enclosure at 15° C. The increase in weight after this treatment is measured.

The adsorption capacity EO.6 is given by the following formula, where W is the weight of the sample and $W_1$ is its increase in weight.

$$EO.6 = \frac{W_1 \times 100}{W}\ (\%)$$

Without wishing to be bound to any particular theory, it is believed that the desirable properties of the activated alumina agglomerates of the invention can be correlated to the structure of the agglomerates obtained before maturing (aging) and that the presence of boehmite at the periphery or face surface of the agglomerates imparts to them an excellent resistance to crushing.

As indicated above, a preferred embodiment for carrying out the invention comprises preparing activated alumina agglomerates by the procedure described above and selecting citric acid as the complexing agent.

It is most significant that the intermediate alumina agglomerates, i.e., the agglomerates obtained following maturing, like the final agglomerates obtained after calcining, all display a wholly original surface morphology.

The intermediate agglomerates or small spheres of alumina comprise a core essentially consisting of poorly crystallized (chi) alumina and amorphous alumina, of boehmite and of bayerite. In said agglomerates, the amount of boehmite is preferably greater than 5% and more preferably ranges from 8% to 20%.

The small spheres of aged alumina have the appearance, on the surfaces thereof, of excrescences constituted by cylindrical balls whose dimensions are very variable. This external surface of said spheres is characteristic.

FIG. 1 is an electron photomicrograph (enlargement 10,000) showing that the surface morphology of the small spheres of matured alumina produced according to the invention, using citric acid as the complexing agent at the time of crushing.

Figure 2:
FIG. 2 is an electron photomicrograph showing the surface morphology of alumina agglomerates prepared in the absence of any complexing agent.

FIG. 2 is a like electron photomicrograph showing, by way of comparison, the morphology of small spheres of matured alumina produced by the same procedure, but without using a complexing agent.

The presence of rods having a length ranging from 0.5 to 2 microns is seen only in FIG. 1.

The final alumina agglomerates that are therefore obtained after thermal treatment present a surface morphology resembling that of the intermediate alumina agglomerates.

Comparison of FIGS. 1 and 2 indicates, significantly, the influence of the presence of the complexing agent on the morphology of the small spheres of alumina produced.

By virtue of their properties, the activated alumina agglomerates of the invention are very well adopted for use as adsorbents, in particular for the purification of gases by adsorption of $CO_2$, $CO$, $N_2$, $NH_3$, hydrocarbons, etc.

They can also be used as supports in chromatography and in the field of catalysis.

In order to further illustrate the present invention and the advantages thereof, the following specific examples are given, it being understood that same are intended only as illustrate and in nowise limitative.

EXAMPLE 1

The starting material was an activated alumina produced by dehydration of hydrargillate and having the following characteristics:

(i) alumina having a PAF of 5%, constituted by chi and amorphous alumina (40%);
(ii) $Na_2O$ content 0.3%;
(iii) BET 300 $m^2/g$;
(iv) Total pore volume TPV 0.30 cc/g;
(v) Total packing density TPD 0.30 cc/g.

75.4 kg of this activated alumina were crushed in a ball-mill to obtain a powder, the mean diameter of whose particles was 10 microns.

During the crushing operation, which was carried out for 45 minutes, an aqueous solution of citric acid prepared by dissolving 68 g of citric acid in 4.75 liters of water, corresponding to a ratio citric acid/$Al_2O_3$ of 0.1%, was sprayed onto the powder.

It was then converted into crushed powder in a granulator. The temperature of the granulation was about 50° C. To facilitate this operation, water was added.

The agglomerates or small spheres of alumina produced had a mean diameter of 3.35 mm, with a loss on heating of about 35%.

Upon removal from the granulator, the particles were stored in a jar and then subjected to a step of maturing by exposure to water vapor at 100° C. over four hours.

X-ray diffraction analysis of the matured small spheres revealed 9% of bayerite and 12% of boehmite.

FIG. 1 illustrates the surface morphology of the matured spheres produced.

After the maturing step, the spheres were dried for 2 hours, 30 minutes, at 220° C. and calcined for 2 hours, 30 minutes, at 450° C.

The final product spheres had the following characteristics:

(a) BET specific surface, 310 $m^2/g$;
(b) Total pore volume TPV, 0.41 cc/g;
(c) Total packing density TPD, 0.830 g/cc;
(d) Crushing resistance CR, 20 daN;
(e) Adsorption capacity EO.6, 21.5%;
(f) Attrition resistance, AR 99%.

EXAMPLE 2

The procedure of Example 1 was repeated, except that over the course of the grinding an aqueous solution of oxalic acid was sprayed onto the powder. It was prepared by dissolving 175 g of oxalic acid in 4.75 liters of water, which corresponds to a ratio oxalic acid/$Al_2O_3$ of 0.25%.

After granulating the powder, small spheres were obtained which were subjected to maturing.

The analysis by X-ray diffraction of the matured spheres showed 4% of bayerite and 15% of boehmite.

The spheres obtained after drying and calcination had the following characteristics:

(a) BET specific surface, 325 $m^2/g$;
(b) total pore volume TPV, 0.45 cc/g;
(c) Total packing density TPD, 0.780 g/cc;
(d) Crushing resistance CR, 15 daN;
(e) Adsorptive capacity EO.6, 22%.

COMPARATIVE EXAMPLE A

In this test, the complexing agent was not used.

The procedure of Example 1 was repeated, except that 76 kg of activated alumina were crushed and 4.75 liters of water were sprayed onto the powder over the course of the crushing.

After granulating the powder, spheres were obtained that were submitted to maturing.

X-ray analysis of the matured spheres revealed 26% of bayerite and 2% of boehmite.

FIG. 2 illustrates the surface morphology of the matured spheres produced.

The spheres obtained after drying and calcination had the following characteristics:

(a) BET specific surface, 330 $m^2/g$;
(b) total pore volume TPV, 0.43 cc/g;
(c) Total packing density TPD, 0.800 g/cc;
(d) Crushing resistance CR, 11 daN;
(e) Adsorptive capacity EO.6, 23%;
(f) Attrition resistance AR, 98.6%.

By comparing Examples 1 and 2 and Comparative Example A, it will be seen that the presence of a complexing agent added over the course of the crushing retards the appearance of bayerite and favors that of boehmite under conditions that normally provide a predominance on bayerite.

There results an increase in the mechanical resistance EGG of the small spheres of activated alumina.

It is also seen that the good adsorption capacity is retained.

In order to compare the crushing resistance of the small alumina spheres obtained by the process of the invention (Example 1) using citric acid as the complexing agent with the small spheres obtained in the absence of a complexing agent (Comparative test A), the crushing resistance of the spheres was determined as a function of their diameter.

Figure 3:
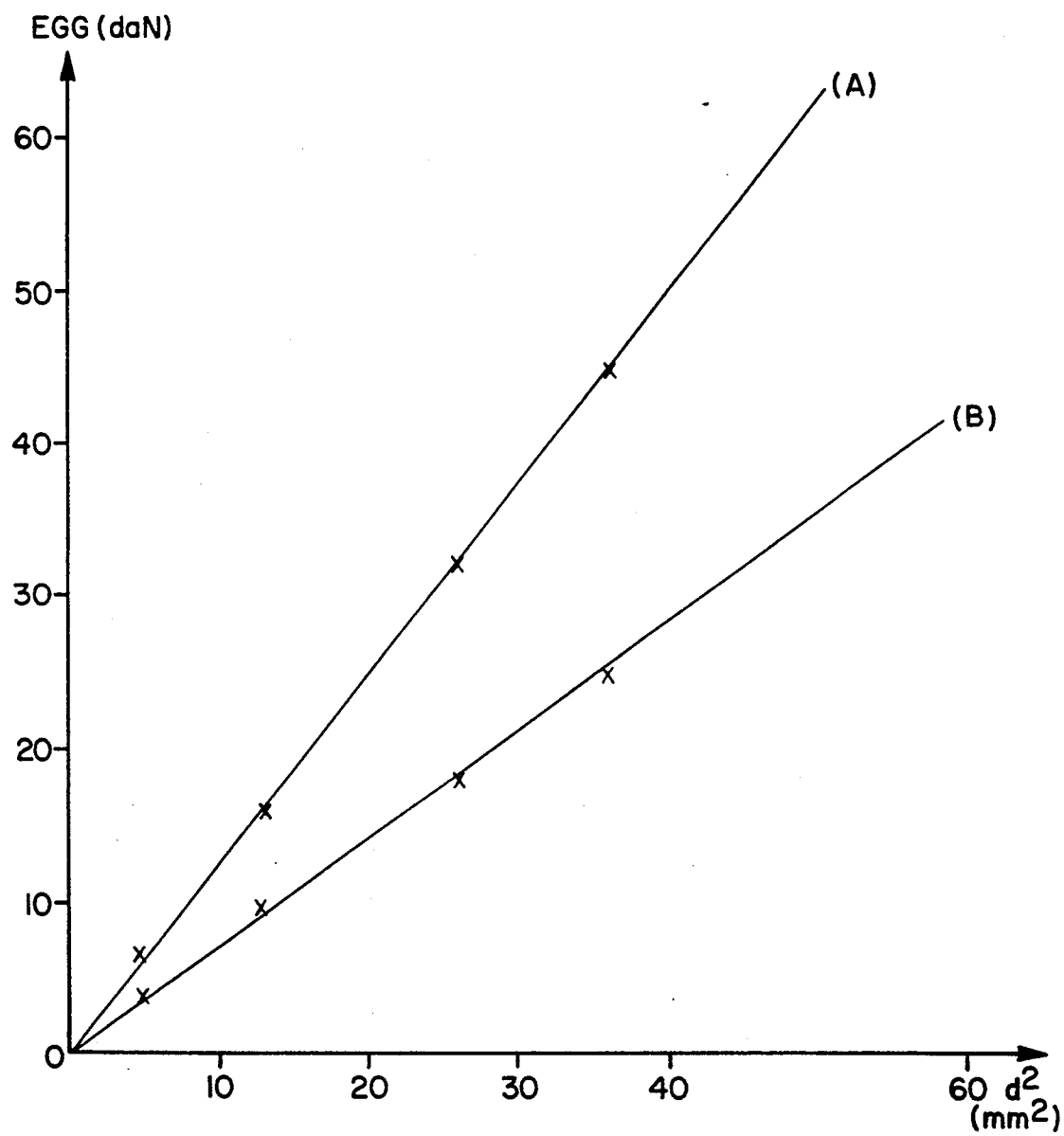
FIG. 3 is a graph plotting crush strength versus particle size of alumina agglomerates prepared using a complexing agent according to the invention and of those agglomerates prepared in the absence of any complexing agent.

FIG. 3 is a graph showing two lines (A) and (B) which represent the variation in the crushing resistance CR in daN as a function of the square of the diameter of the sphere in mm$^2$.

The variation in CR as a function of d$^2$ corresponds, respectively: in the case of the spheres of Example 1 of the invention, to the equation $y = 1.3\,x$ (line A), in the case of the spheres of Comparative Example A, to the equation $y = 0.7\,x$ (line B).

A comparison of the slopes of the lines indicates the net increase in the resistance to crushing of the alumina spheres of the invention.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of activated alumina agglomerates having a crush resistance of at least 12 daN, measured on that fraction thereof having a mean diameter ranging from 3 to 4 mm, and an adsorptive capacity greater than 18% by weight, comprising agglomerating activated alumina particulates, maturing the resulting agglomerates in the presence of a complexing agent for the cation Al$^{3+}$, and then thermally treating the matured agglomerates at a temperature ranging from about 100° to 500° C., said complexing agent comprising a phosphorus acid having one of the following formulae (I) to (III):

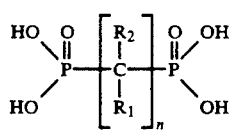

(I)

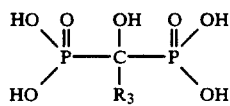

(II)

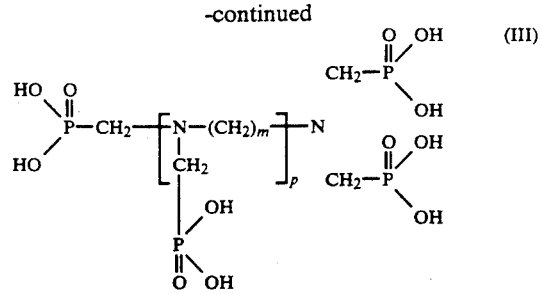

(III)

in which formulae (I) to (III), n and m are integers ranging from 1 to 6; p is an integer ranging from 0 to 5; and R$_1$, R$_2$ and R$_3$, which may be identical or different, each represents a hydrogen atom or an alkyl, aryl, aralkyl, hydroxy or amino radical.

2. A process for the preparation of activated alumina agglomerates having a crush resistance of at least 12 daN, measured on that fraction thereof having a mean diameter ranging from 3 to 4 mm, and an adsorptive capacity greater than 18% by weight comprising agglomerating activated alumina particulates, maturing the resulting agglomerates in the presence of a complexing agent for the cation Al$^{3+}$, and then thermally treating the matured agglomerates at a temperature ranging from about 100° to 500° C., said complexing agent comprising methylene aminotriphosphonate, methylene ethylenediaminotetraphosphonate, methyl triethylenetetraaminohexaphosphonate, methylene tetraethylenepentaaminoheptaphosphonate, methylene pentaethylenehexaaminooctaphosphonate; a diphosphonate of methylene, 1,1'-ethylene, 1,2-ethylene, 1,1'-propylene, 1,3-propylene, and 1,6-hexamethylene; 2,4-dihydroxypentamethylene-2,4-diphosphonate; 2,5-dihydroxyhexa-methylene-2,5-diphosphonate; 2,3-dihydroxybutylene-2,3-di-phosphonate; 1-hydroxybenzyl-1,1'-diphosphonate; 1-amino-ethylene-1,1'-diphosphonate; hydroxymethylene diphosphonate; hydroxyethylene-1,1'-diphosphonate; 1-hydroxypropylene-1,1'-diphosphonate; 1-hydroxybutylene-1,1'-diphosphonate; or 1-hydroxyhexamethylene-1,1'-diphosphonate.

3. The process as defined by claim 1 or 2, comprising maturing under atmospheric pressure.

4. The process as defined by claim 1 or 2, said starting material activated alumina particulates having been produced by rapid dehydration of hydrargillite.

5. The process as defined by claim 1 or 2, wherein the amount of said complexing agent ranges from 0.01% to 5% by weight of said activated alumina particulates.

6. The process as defined by claim 1 or 2, comprising crushing said activated alumina particulates in the presence of said complexing agent, upstream of the agglomeration thereof.

7. The process as defined by claim 1 or 2, comprising agglomerating said activated alumina particulates in the presence of said complexing agent.

8. The process as defined by claim 1 or 2, comprising adding said complexing agent to said agglomerates, upstream of the maturing thereof.

9. The process as defined by claim 1 or 2, comprising maturing at a temperature ranging from 80° to 120° C.

10. The process as defined by claim 1 or 2, comprising drying the matured agglomerates.

11. The product of the process recited in claim 1.

12. The product of the process recited in claim 1.

* * * * *